(12) United States Patent
Bleisch et al.

(10) Patent No.: US 7,949,998 B2
(45) Date of Patent: May 24, 2011

(54) PROGRAMMING FRAMEWORK FOR CLOSED SYSTEMS

(75) Inventors: Paul L. Bleisch, Sammamish, WA (US); Shawn Hargreaves, Redmond, WA (US); Tom Miller, Redmond, WA (US); Matthew Orren Picioccio, Sammamish, WA (US); John M. Walker, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 1068 days.

(21) Appl. No.: 11/737,921

(22) Filed: Apr. 20, 2007

(65) Prior Publication Data

US 2008/0263537 A1 Oct. 23, 2008

(51) Int. Cl.
*G06F 9/44* (2006.01)
(52) U.S. Cl. ......... 717/120; 717/138; 713/164; 713/166
(58) Field of Classification Search .................... 717/138
See application file for complete search history.

(56) References Cited

U.S. PATENT DOCUMENTS

| | | | | |
|---|---|---|---|---|
| 5,680,534 | A | 10/1997 | Yamato et al. | 395/173 |
| 6,115,036 | A | 9/2000 | Yamato et al. | 345/328 |
| 6,646,653 | B2 | 11/2003 | San et al. | 345/649 |
| 7,116,782 | B2 | 10/2006 | Jackson et al. | 380/251 |
| 7,549,165 | B2 * | 6/2009 | Focke et al. | 726/22 |
| 7,562,353 | B2 * | 7/2009 | Bedner et al. | 717/140 |
| 7,591,003 | B2 * | 9/2009 | Focke et al. | 726/1 |
| 2002/0045484 | A1 * | 4/2002 | Eck et al. | 463/42 |
| 2002/0086729 | A1 | 7/2002 | Emmerson et al. | 463/41 |
| 2002/0091800 | A1 * | 7/2002 | Wilkinson et al. | 709/219 |
| 2003/0069074 | A1 | 4/2003 | Jackson | 463/43 |
| 2003/0203756 | A1 | 10/2003 | Jackson | 463/42 |
| 2004/0038740 | A1 | 2/2004 | Muir | 463/40 |
| 2006/0100011 | A1 | 5/2006 | Morrow et al. | 463/29 |

FOREIGN PATENT DOCUMENTS

EP 1187017 A2 * 3/2002

OTHER PUBLICATIONS

Scacchi, W., "Understanding the Requirements for Developing Open Source Software Systems", *IEEE*, Dec. 2001, Paper No. 29840, 1-26, http://kb.cospa-project.org.
Twilleager, D. et al., "Java™ Technologies for Games", *ACM Computers in Entertainment*, 2004, 2(2), 1-9, http://delivery.ac.org.
"Open Source & Low Cost Game Engines", http://delivery.acm.org, 60 pages, 2004-2005.
EP Application No. 08744146: Extended European Search Report dated Jun. 9, 2010, 9 pages.
Gosling et al., "The Java Language Environment", A White Paper, XP 002042922, Sun Delivers Java Workshop, Oct. 1, 1995, 86 pages.

* cited by examiner

*Primary Examiner* — Wei Y Zhen
*Assistant Examiner* — Phillip H Nguyen
(74) *Attorney, Agent, or Firm* — Woodcock Washburn LLP (57) ABSTRACT

Mechanisms are disclosed that allow for platform abstraction of a computing platform using a programming framework. The programming framework allows application programs to interact with different platforms in an identical manner by abstracting the platform. The application uses identical instructions to the programming framework across different platforms, with the programming framework modifying the instructions to fit platform specific requirements. The programming framework also emulates platform specific expected application behavior on behalf of the application. The programming framework may also provide an additional layer of security for the platform, limiting the access of the application program.

19 Claims, 7 Drawing Sheets

PROGRAMMING FRAMEWORK FOR CLOSED SYSTEMS

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2007, Microsoft Corp.

BACKGROUND

Developing a software application that performs well on one computing platform is a complicated task, but developing an application that performs well on multiple platforms is even more difficult. There are many tasks that must be performed and managed to control the hardware and operating system of a computing platform in order to produce the results desired by the developer, and the ways these tasks are accomplished can vary widely between platforms. There are also expectations of application behavior that vary between platforms. For the professional software developer, writing code that correctly performs all the tasks required on different platform and creating a new application that conforms to the expected behavior of those platforms is very time consuming and complicated, despite having the full support of the platform manufacturer. For the hobbyist, student developer, or other programmer outside the manufacturer's circle of approved developers, this aspect of application development is even more challenging.

This is especially true in closed systems, such as game consoles. Game consoles typically allow only "signed" or authenticated games controlled by the manufacturer to execute on such consoles. This restriction may be done for various reasons, including preservation of the business model of maintaining a tightly controlled environment for publishers, prevention of intellectual property piracy, or controlling the potential for cheating. However, there is a burgeoning market of homebrew developers and hobbyists who want to create their own programs for closed systems as well as more open platforms. These developers spend time and effort to hack game consoles in order to allow the running of unsigned code on such consoles. It would be desirable to have a legitimate way for such developers to create their content without having to break into closed systems while still maintaining a level of protection for those systems.

Therefore, what is needed is a way to free developers from having to customize their software for different platforms and operating systems. It would simplify their work greatly if developers could write programs using a standard interface to the operating system, or programming framework, that would allow the program to run on different platforms without customizing the application code to deal with different underlying software or hardware. Such a framework would need to allow developers to interact with the operating systems of various computing devices in the same way, letting the programming framework deal with the differences in underlying code and hardware. The interface would also protect the underlying platform by including checks and validations ensuring that the supplied developer code adheres to the limitations and requirements of the platform. This would free the developer to focus their programming efforts on the creative aspects of their program without having to worry about the more tedious tasks of making the program work with different operating systems and hardware.

SUMMARY

Mechanisms are provided that allow developer code to access the resources of a computing system through a programming framework that abstracts the underlying platform. By providing a consistent framework across multiple platforms, a manufacturer can facilitate third party development of software by making it easier to gain access to operating system resources and hardware. In one aspect of the presently disclosed subject matter, a programming framework is provided between a platform's operating system layer and the application software. This framework forms an intermediate layer which communicates on behalf of the application software with various system layers, such as a graphics layer, an audio layer, an input layer, and a storage layer. These system layers work with the platform operating system and hardware, accomplishing the required tasks on the platform to implement the application software.

The programming framework provides a standard interface to the computing platform, allowing developer content to control aspects of the operating system and associated resources. This provides a way to control various platforms using the same application code, thus freeing the developer from having to worry about making specific hardware and operating system resources work with their application. The programming framework creates platform abstraction, so that the developer code interacts the same way with a single, abstracted version of a computing platform regardless of the actual platform on which the code is running. This framework implements the platform specific aspects of instructing the operating system and hardware to perform the tasks necessary to implement the developer application, freeing the developer from this task. The framework also provides the appropriate behavior expected by the platform so that the application can successfully run on the platform, and adds an additional layer of security between the application code and the platform.

It should be noted that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. The following figures are included.

DETAILED DESCRIPTION

Overview

Typically, an application running on a computer platform interacts directly with the operating system. Through the operating system, the application manipulates the platform hardware and resources as needed to complete tasks. The application will usually use application program interfaces (APIs) to communicate with individual elements of the operating system to achieve the system level tasks that it requires. Examples of such tasks include rendering of graphical images on a monitor, creating audio output on a speaker, receiving input from the user through a device (e.g., a keyboard, mouse, or game controller), accessing memory, and accessing storage devices (e.g., a hard disk drive, floppy disk drive, or flash drive). The APIs and how they are used will vary from platform to platform necessarily as the hardware and operating system varies between platforms. Therefore, each application running on a platform has to properly interact with the specific operating system of that platform and its associated APIs if it is to work as intended. Moreover, there are behaviors that are expected of applications running on computer platforms. These expected behaviors also vary widely depending on the platform. Failure of an application to operate according to platform expectations can cause the application to fail or perform incorrectly.

On the other hand, most application software running on computer platforms will have similar requirements with regards to what it needs and expects from platform resources. That is, application software will most often require the use of hardware and software that is typical of most computing platforms, such as memory, a visual display, a controller, etc. Therefore, it is possible to provide an interface for applications that abstracts the platform, such that the application sees the same interface to the platform regardless of the platform, while still providing access to the resources required by most applications. By providing such an interface, developers are freed from having to concentrate on platform specific aspects of their applications and can create a single program that interacts successfully with multiple platforms.

In one exemplary and non-limiting aspect of the present disclosure, a programming framework is provided to perform platform abstraction. The programming framework provides an interface to the platform similar to an API for an individual platform resource, but the programming framework may be an interface to the entire platform, allowing access to several of its resources. Because the application software is working with an abstracted version of a platform, the application software performs the same action to accomplish a task through the programming framework regardless of the hardware or software underlying the framework. The programming framework takes a request for a platform resource from the application and transmits that request to the resource, modifying and formatting the request so that it is correctly received in the specific way required by the resource, thereby ensuring correct execution of the request. Likewise, information and requests from the system resources destined for the application software are communicated to the application software through the programming framework.

The programming framework also provides the expected behaviors to the platform on behalf of the application so that the application appears to be "well-behaved" to the platform. This relieves the developer from having to accommodate the differences in expected behaviors of various platforms.

The programming framework provides an additional layer of security for the platform. By providing a standardized interface to the platform, the framework controls how communication and requests from the application software reach the platform resources. This provides an additional check against application developer code that may otherwise access restricted platform resources or perform actions that are unsafe or undesirable to the platform or the platform manufacturer. The programming interface also reduces the incentive to hack computing systems, especially closed systems such as game consoles, by providing an easier, more efficient way to access platform resources to the hobbyist or homebrew developer, thus removing the need for such hacking.

Aspects of the Programming Framework

This section of the presently disclosed subject matter focuses on aspects of a programming framework to provide platform abstraction. The presently disclosed subject matter applies to any computing device wherein it may be desirable to allow software developers to create application software that accesses at least one of the device's resources. In order to gain a better appreciation for this framework, it is instructive to look at the prior art.

Figure 1:
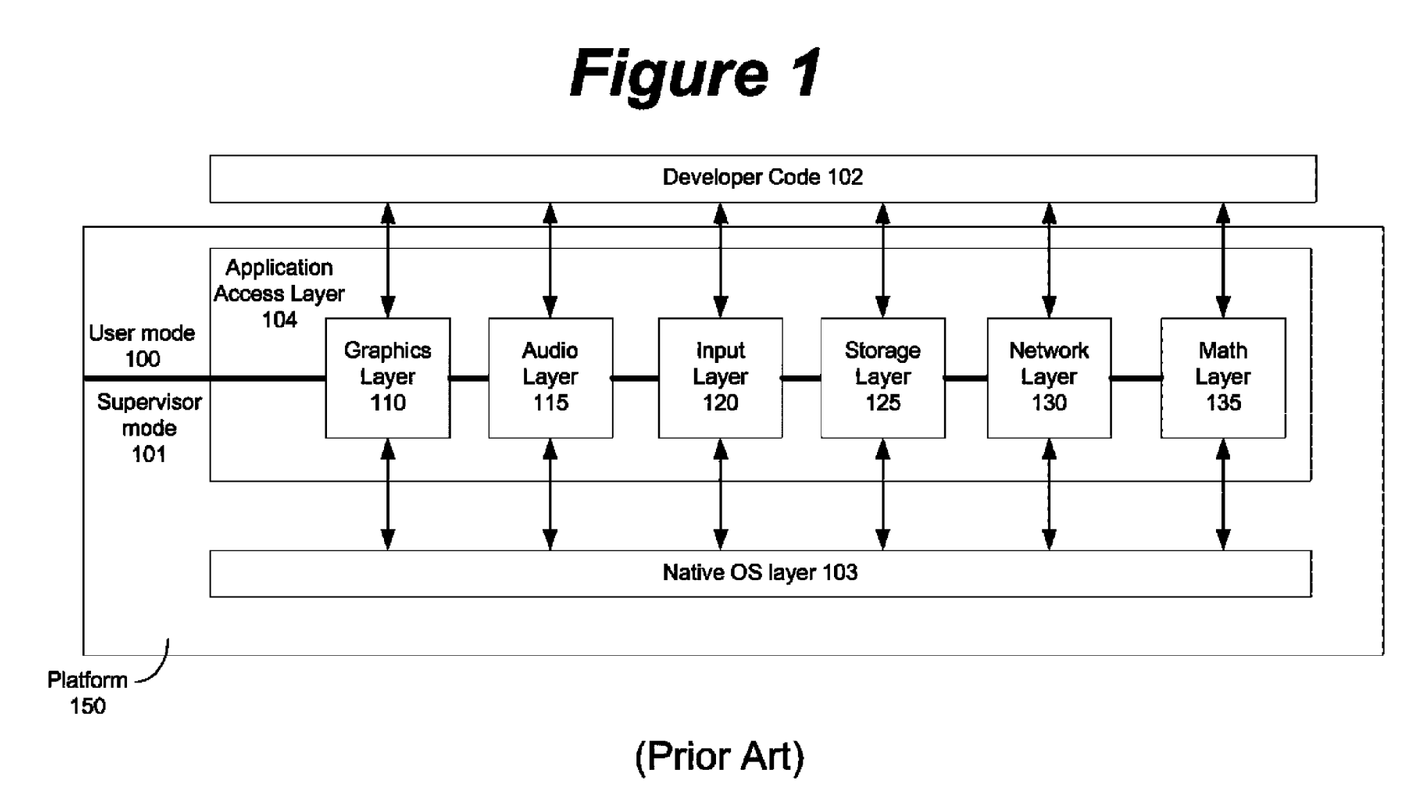
FIG. 1 illustrates a prior art system where developer software interacts directly with operating system layers.

FIG. 1 illustrates a prior art system on platform 150 where developer code 102 interacts directly with various layers of the operating system to achieve the desired results. The platform 150 may be a closed computing device, such a gaming console, wherein the closed computing device is configured to execute operating system and game software, or it may be a more open platform such as a personal computer configured to execute a wide variety of software. Shown are example layers that may be available on a typical platform 150. These include a graphics layer 110, an audio layer 115, an input layer 120, a storage layer 125, a network layer 130, and a math layer 135. Each of these layers is responsible for a different task. For example, the graphics layer 110 may be responsible for rendering the graphics (including but not limited to flat shading, normal mapping, texture mapping, and so on); the audio layer 115, as is suggested by the title, may be responsible for the audio on a closed system; the input layer 120 may be responsible for handling input from users, such as controller button selection, clicking using input devices, and so on; the storage layer 125 may be responsible for storing certain content or recalling certain content; the network layer 130 can allow for network access, such as allowing the application to contact a server on the Internet; and the math layer 135 may allow for the performance of certain math functions, e.g., to allow for more efficient map rendering (if graphics are involved).

Each of these layers 110, 115, 120, 125, 130 and 135 helps to provide access to platform 150 resources for an application. They also provide a secure gate between user mode 100 and supervisor (e.g. kernel) mode 101 that developer code 102 may need to go through to ensure secure computing (namely, so that developer code does not take over the underlying native OS layer 103 and any associated platform 150 resources for purposes unintended by the platform manufacturer or other interested parties).

The layers 110, 115, 120, 125, 130 and 135 are typically platform, operating system, or hardware specific. For example, the software composing the storage layer 125 for a platform with a 32 GB hard drive will differ from the software used on a platform with a 64 GB hard drive. Likewise, one version of a platform operating system may implement the storage layer 125 differently than a previous version. This is necessarily the case because different hardware requires different software to control it. Likewise, different versions of the underlying operating system are going to have different software and different methods of accomplishing system tasks.

Typically, the layers 110, 115, 120, 125, 130 and 135 are going to be accessed through the application access layer 104 by means of APIs. These APIs will vary as the software composing the layers varies. Therefore, the application code has to allow for this and either detect and provide appropriate input to the various APIs that exist on all platforms where it is desired that the application software run properly, or be limited to a single platform. While this is understood and handled by professional developers on a regular basis, it would be much easier for them to have a common framework with which to work so that they did not have to spend time making sure their code was multi-platform compatible. For novice developers and hobbyists, multi-platform support is an even greater challenge.

Moreover, APIs that would be used to access layers 110, 115, 120, 125, 130 and 135 may be very specific and complicated, requiring a thorough understanding of their requirements and how they function with the layer. Failure to provide complete and correct data to an API when requesting a task may result in failure of the task or error conditions. The API may also expect certain behaviors from applications in order to function properly. Knowledge of these behaviors may not be readily accessible to non-professional developers or those not directly working with, or with the approval of, the platform manufacturer. Again, while this is commonly handled by professional developers, dealing with these aspects of software development can be a very daunting task for the novice developer.

Figure 2:
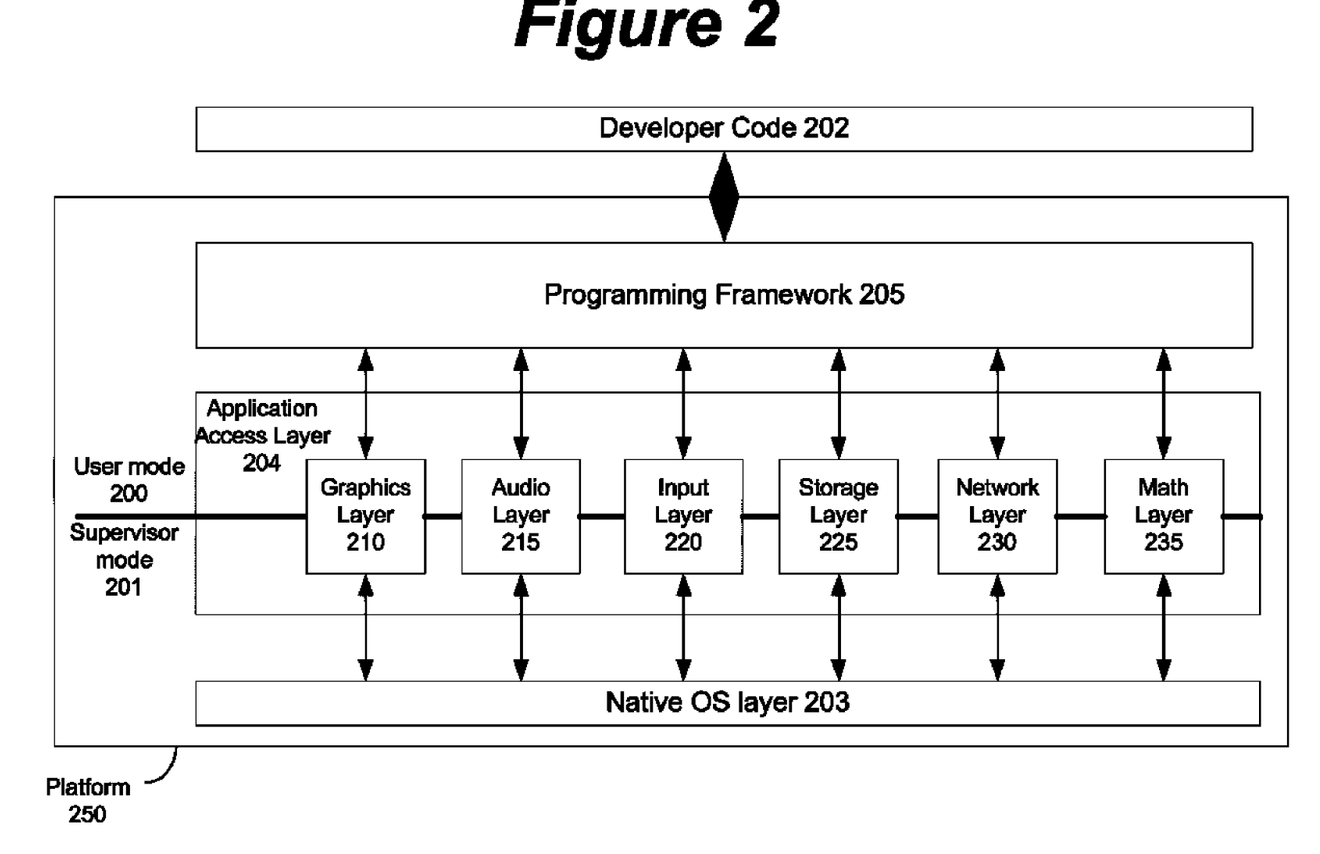
FIG. 2 is a diagram that illustrates an example system where developer software interacts with a programming framework as a way to communicate with operating system layers.

In contrast to FIG. 1, FIG. 2 illustrates a system that utilizes a programming framework 205 to facilitate communication between the developer code 202 and elements of the platform 250. Platform 250 may be a closed computing device, such a gaming console, or a more open platform, such as a personal computer, wherein the computing device is configured to execute operating system software components that implement the programming framework 205. The layers 210, 215, 220, 225, 230 and 235 in the application access layer 204 are similar in function to those described above for FIG. 1. The programming framework 205 abstracts the APIs used to access the layers 210, 215, 220, 225, 230 and 235. In an exemplary and non-limiting aspect of the present disclosure, the programming framework 205 provides a simplified interface to platform resources such as layers 210, 215, 220, 225, 230 and 235. The term "interface" used herein contemplates a broad definition of any inputs and outputs that would be typically used by software.

Figure 3:
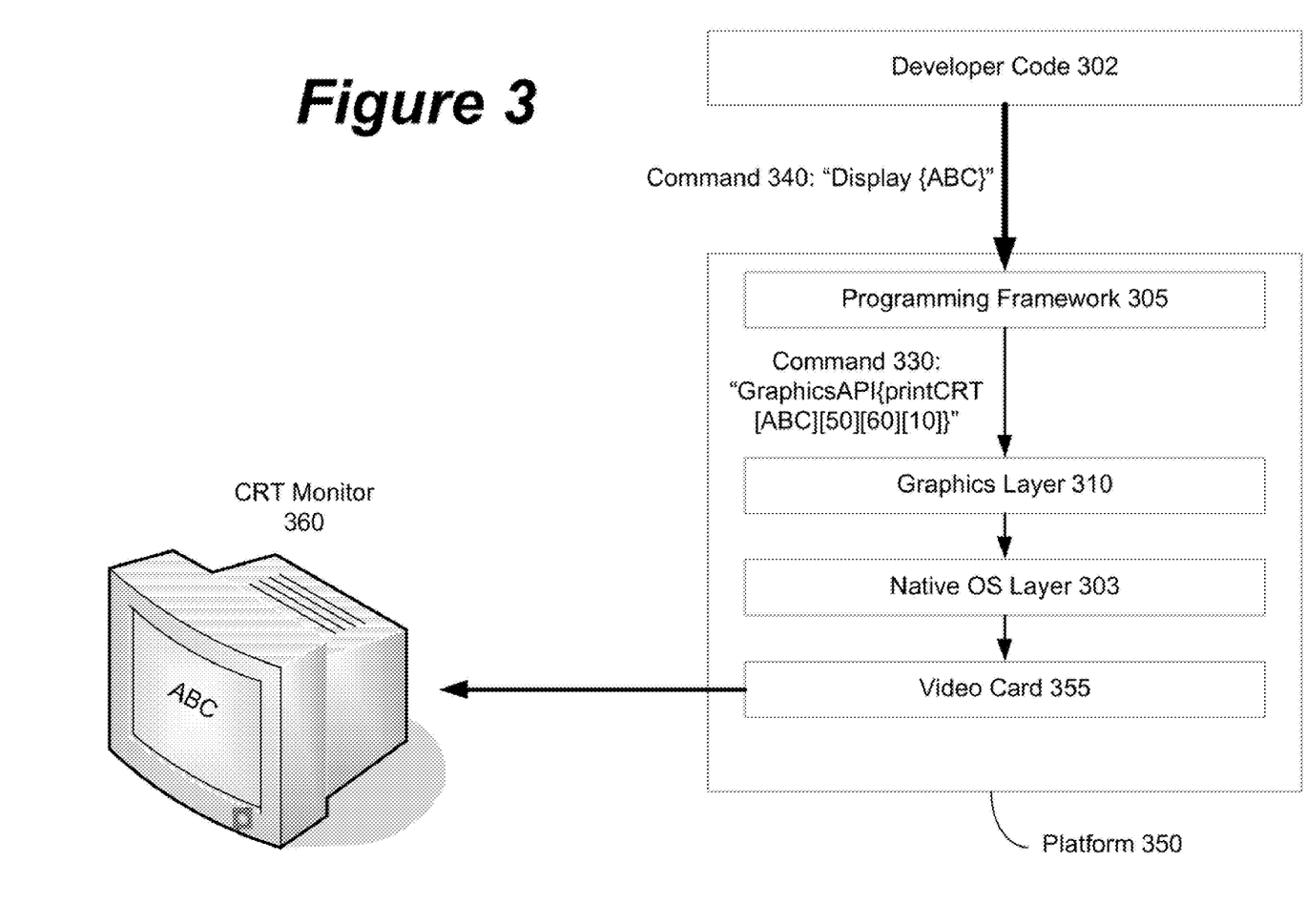
FIG. 3 is a diagram that illustrates an example way a programming framework provides platform abstraction by converting a developer software request into a format expected by the operating system graphics layer.
Figure 4:
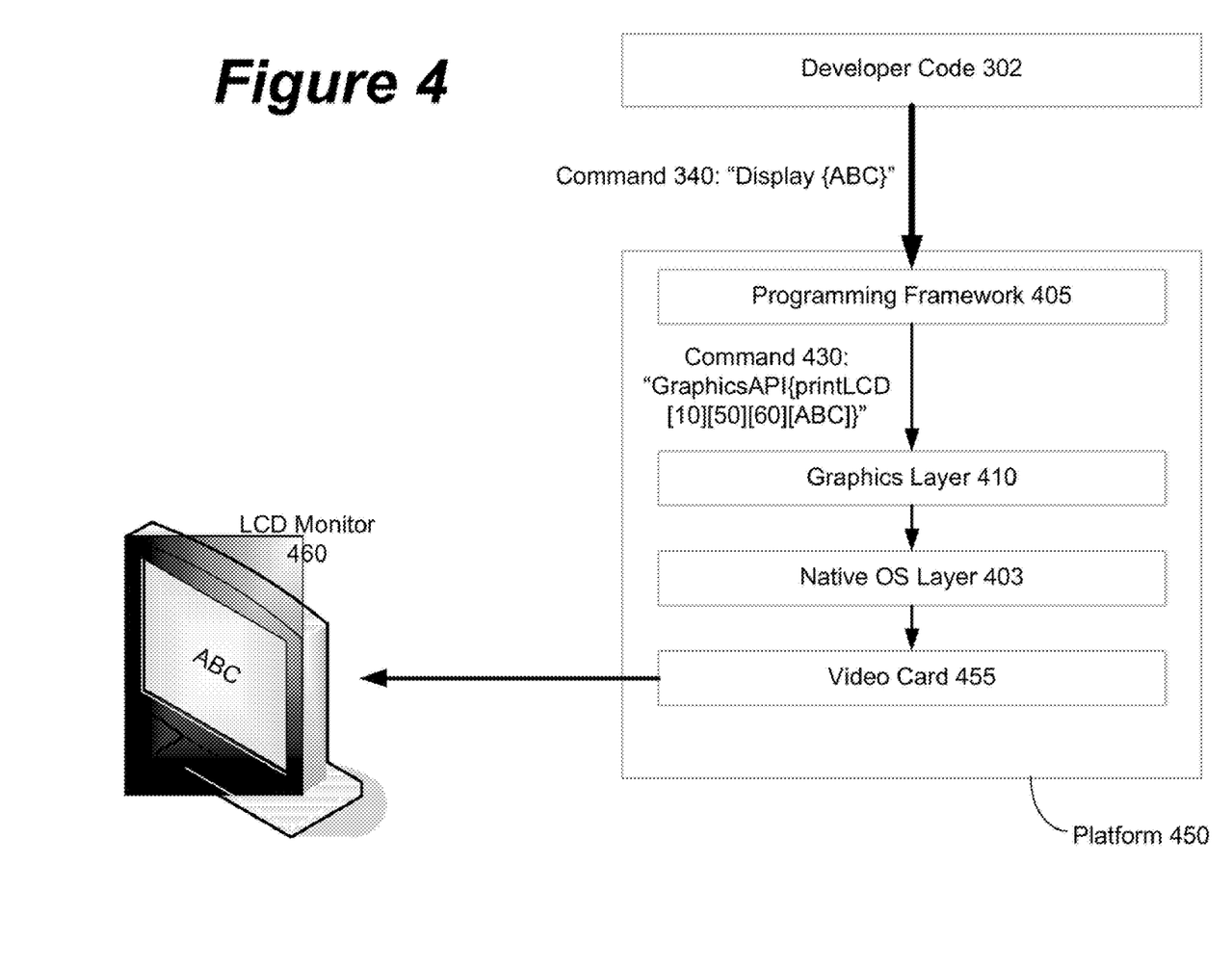
FIG. 4 is a diagram that further illustrates an example way a programming framework provides platform abstraction by converting a developer software request into another format expected by a different operating system graphics layer.

FIGS. 3 and 4 show a very simplified example of how the programming framework would facilitate development of application software and provide platform abstraction. Note that the examples described herein are very limited in the parts of a computing system displayed and greatly simplified for purposes of explanation of the present subject matter. Note also that the examples used herein of commands are simplified commands for illustrative purposes only and do not in any way imply what actual commands may be used or limit the present disclosure.

FIG. 3 illustrates an example system on platform 350, with video card 355, native operating system 303, graphics layer 310 and programming framework 305. There is a CRT (cathode ray tube) monitor 360 connected to platform 350 via the video card 355. Developer code 302 running on platform 350 could request that the platform 350 display a character set on a display. In this example, developer code 302 is requesting a display of the characters "ABC" on the monitor 360. This request is transmitted to the programming framework with the command 340 "Display {ABC}". The programming framework 305 would take this request, modify it to conform to the requirements of the graphics layer 310, and submit it to the graphics layer 310. It is assumed for this example that the graphics layer 310 requires the command to be formatted as illustrated in command 340 "GraphicsAPI {printCRT [ABC][50][60][10]}". In this illustrative example, the graphics layer 310 requires fields for other display characteristics beyond the characters to be displayed, which the programming framework 305 provides, relieving the application developer code 302 of the burden of knowing about the specific requirements of the graphics layer 310. The graphics layer 310 then works with the operating system layer 303, which controls the video card 355, which in turn instructs the CRT monitor 360 to display the characters.

Contrast FIG. 3 with FIG. 4, where a system is illustrated with platform 450, video card 455, native operating system 403, graphics layer 410 and programming framework 405. There is an LCD (liquid crystal display) monitor 460 connected to platform 450 via the video card 455. Here, the same developer code 302 is running on this platform 450, and makes an identical request to the programming framework 405 with the same command 340 as in FIG. 3, "Display {ABC}". The programming framework 405 takes this request and formats it properly for graphics layer 410, but in this case, since the platform 450 has different resources than platform 350 illustrated in FIG. 3, the command requirements of the graphics layer 410 are different than those of graphics layer 310. Therefore, the programming framework 405 issues the command "GraphicsAPI {printLCD [10][50][60][ABC]}" to the graphics layer 410. However, the application developer code 302 can be completely agnostic to the differences in the underlying platforms 350 and 450 and still achieve the same result with the same command 340. The graphics layer 410 then works with the operating system layer 403, which controls the video card 455, which in turn instructs the LCD monitor 460 to display the characters.

This example shows how the programming framework provides platform abstraction. In both examples illustrated by FIG. 3 and FIG. 4, the developer code 302 was able to transmit the same command 340 to the programming frameworks 305 and 405, despite the differences in underlying software and hardware. The developer code 302 was able to interact with the platforms 350 and 450 without having to address the differences between the platforms, including different requirements for working with the graphics layer APIs. This ability to abstract the platform away from the developer code greatly simplifies the job of creating multi-platform compatible applications. A large amount of the tedious labor required to ensure that code is viable across platforms is removed by the use of a programming framework as described herein.

Figure 5:
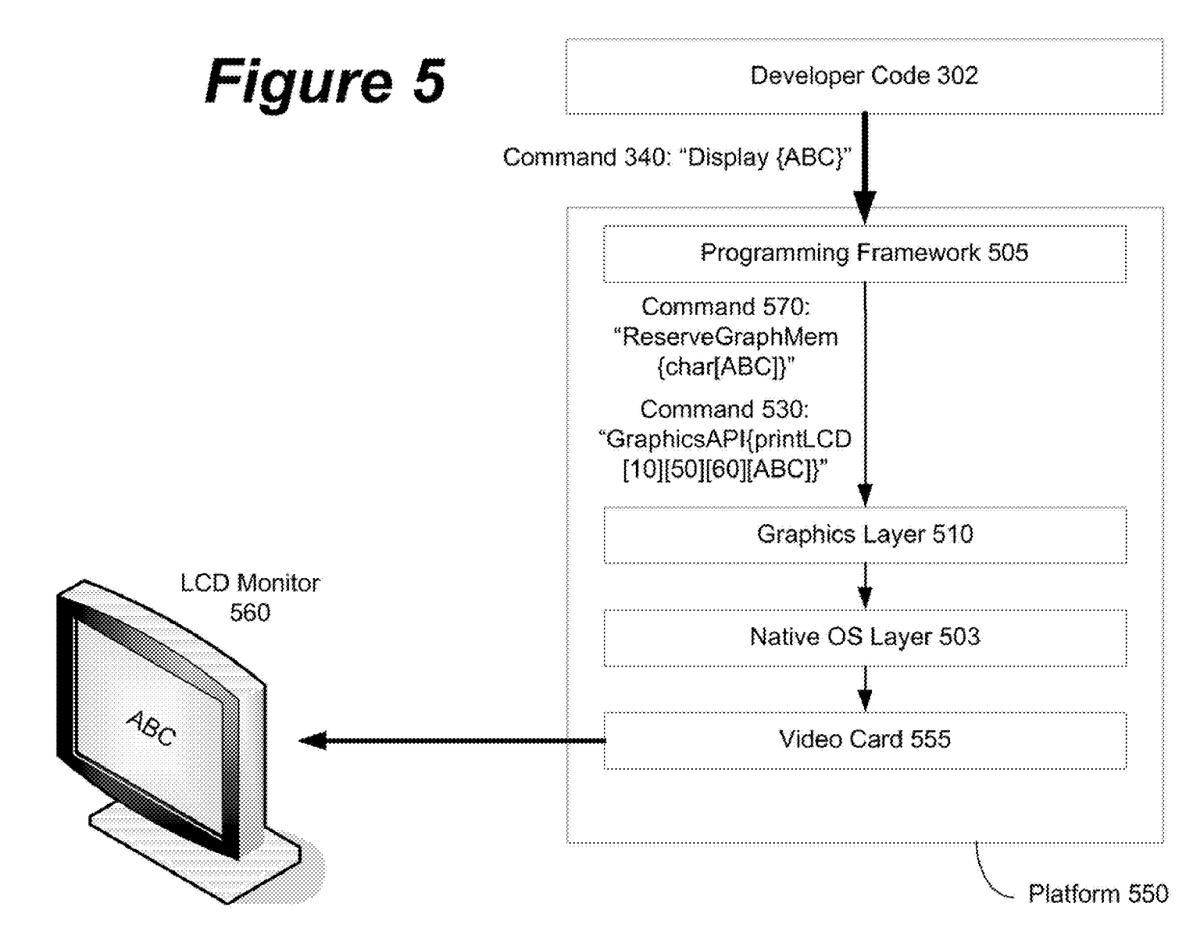
FIG. 5 is a diagram that illustrates an example way a programming framework provides platform abstraction by emulating proper code behavior when communicating a request from the developer code to the operating system graphics layer.

FIG. 5 illustrates how the programming framework 505 may help ensure that the developer code exhibits the proper behavior in its interaction with the platform 550. Similar to FIGS. 3 and 4, the developer code 302 communicates a request in the form of command 340 to the programming framework 505. The framework 505 receives the request 340 and takes the steps to have that command implemented in the underlying hardware and software. In this example, if the graphics layer 510 required that a command such as command 530 requesting the display of characters always be preceded by a command 570 requesting memory space for the characters to be displayed, then the programming framework 505 would provide this additional request 570. As part of its duties of platform abstraction, the framework 505 would issue any necessary additional commands and perform additional actions required to allow the developer code 302 to appear to behave correctly from the perspective of the operating system layers, thus helping to ensure that the developer code 302 is executed as intended. This also frees the developer from having to include the different variations of code behavior in the application code 302 to accommodate the various behaviors expected by different platforms.

The programming framework can also provide an added layer of security for the platform. Referring again to FIG. 2, if the developer code 202 issued a request to the programming framework 205 for access to resources to which it should not have access, or attempted to control or otherwise perform a task that was not permitted or desired by the platform manufacturer, the programming framework 205 would serve as an added defense. The programming framework 205 may also simply not make available through its interface commands or program calls that allow such prohibited behavior. While systems within the platform 250, such as the graphics layer 210 or the storage layer 225, typically have built-in protection devices, the addition of the programming framework 205 serves to further secure those resources. For example, if the developer code 202 issued a request to write to a piece of memory that was currently in use as part of the kernel or native operating system software 203, the programming framework 205 would be the first line of defense against such a request. The framework 205 may have a list of restricted memory locations received from the storage layer 225 which it uses to check against memory requests from the developer code 202. In other cases, the programming framework 205 may have a static list of certain commands or functions that are strictly not allowed for developer code 202, such as disk formatting or changing passwords.

An additional, less direct security feature of a programming framework is the reduction in incentive to hack into the platform, especially with regards to closed systems such as game consoles. If a programming framework such as that described herein is made available to hobbyists and novice developers, allowing them to easily create software within the limits provided by the framework, then those developers will likely choose to use it instead of hacking into the platform. The programming framework would allow such developers to concentrate their efforts on the creative aspects of developing their software. They would not have to spend time and energy figuring out how to get around the restrictions and required software signing of closed systems. Even in open systems, the presence of an accessible and easy-to-use programming framework will allow developers to more efficiently take advantage of the resources available with the platform, and stimulate user development of new software.

Exemplary Computing Device

Figure 6:
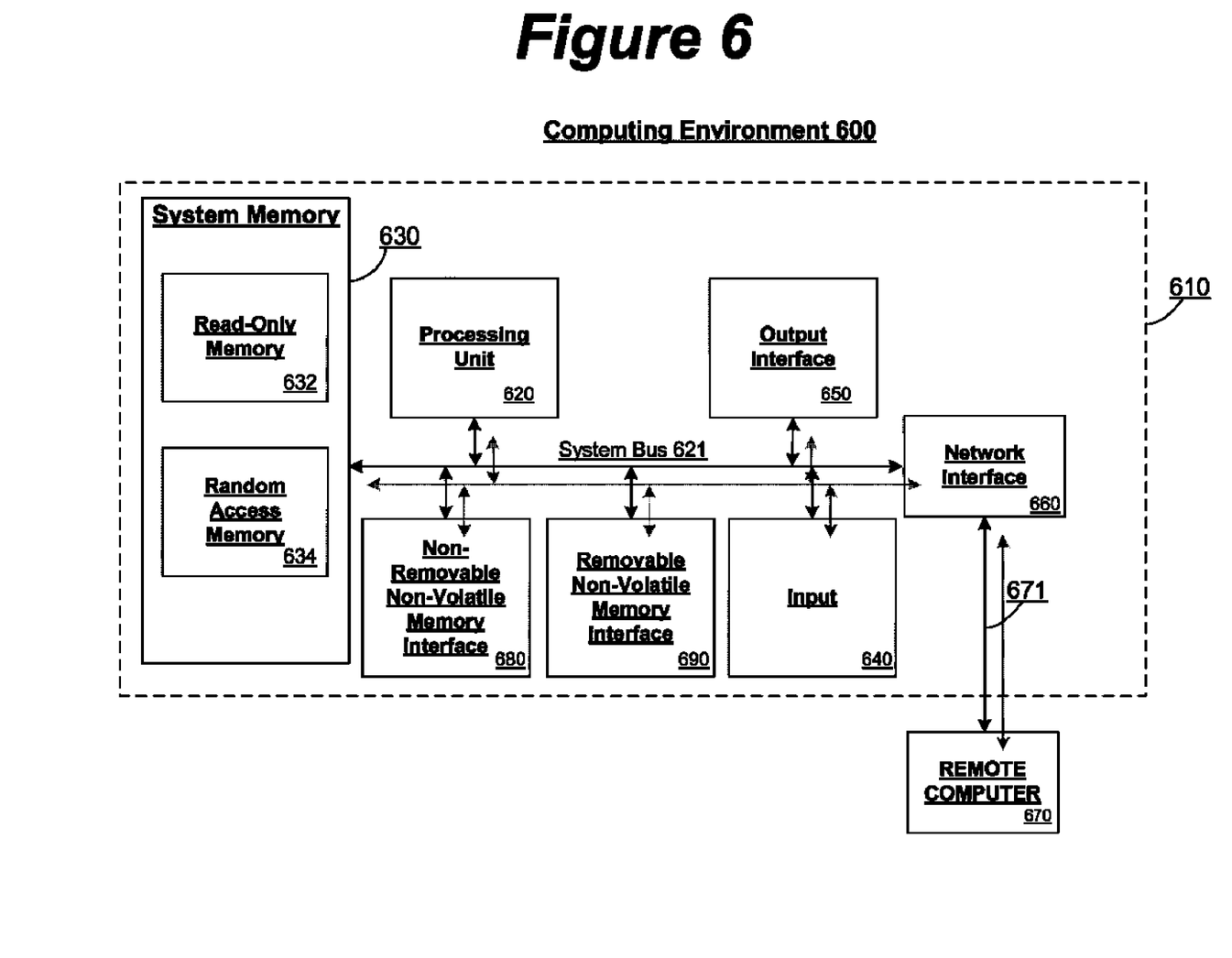
FIG. 6 illustrates a block diagram representing an exemplary non-limiting computing system environment on which a programming framework may be implemented in accordance with the presently disclosed subject matter.

As mentioned, the presently disclosed subject matter applies to any computing device wherein it may be desirable to allow software developers to create application software that accesses at least one of the device's resources. It should be understood, however, that other equivalent content to that of application software can work with presently disclosed programming framework, and the presently disclosed subject matter can be implemented on computing devices of all kinds, not limited to the examples described herein. Accordingly, the general purpose computing device described below in FIG. 6 is but one example, and the present subject matter may be implemented with any client, server, portable, or non-portable device, whether standalone or having network/bus interoperability and interaction. Thus, the present subject matter may be implemented in an environment of networked hosted services in which very little or minimal client resources are implicated, e.g., a networked environment in which the client device serves merely as an interface to the network/bus, such as an object placed in an appliance.

Although not required, the present subject matter can partly be implemented via an operating system, for use by a developer of services or software for a device or object, and/or included within application software that operates in connection with the present subject matter. Software may be described in the general context of computer-executable instructions, such as program modules, being executed by one or more computers, such as client workstations, servers or other devices. Those skilled in the art will appreciate that the present subject matter may be practiced with other computer system configurations and protocols.

FIG. 6 thus illustrates an example of a suitable computing system environment 600, in which the various aspects described with reference to FIGS. 1-5 may be implemented, although as made clear above, the computing system environment 600 is only one example of a suitable computing environment for implementation of the presently disclosed subject matter and is not intended to suggest any limitation as to the scope of use or functionality of these various aspects of the present disclosure. Neither should the computing environment 600 be interpreted as having any dependency or requirement relating to any one or combination of components illustrated in the exemplary operating environment 600.

With reference to FIG. 6, an exemplary computing device for implementing the aforementioned aspects includes a general purpose computing device in the form of a computer 610, also referred to above as a platform. Components of computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures.

Computer 610 typically includes a variety of computer readable media. Computer readable media can be any available media that can be accessed by computer 610. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 610. Communication media typically embodies computer readable instructions, data structures, program modules or other data in a modulated data signal such as a carrier wave or other transport mechanism and includes any information delivery media.

The system memory 630 may include computer storage media in the form of volatile and/or nonvolatile memory such as read only memory (ROM) 632 and/or random access memory (RAM) 634. A basic input/output system (BIOS), containing the basic routines that help to transfer information between elements within computer 610, such as during start-up, may be stored in memory 630. Memory 630 typically also contains data and/or program modules that are immediately accessible to and/or presently being operated on by processing unit 620. By way of example, and not limitation, memory 630 may also include an operating system, application programs, other program modules, and program data.

The computer 610 may also include other removable/non-removable, volatile/nonvolatile computer storage media. For example, computer 610 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 621 through a non-removable memory interface such as an interface 680, and a magnetic disk drive or optical disk drive is typically connected to the system bus 621 by a removable memory interface, such as an interface 690.

In addition to a user being able to provide input to the closed computing device via controllers, a user may enter commands and information into the computer 610 through input devices such as a keyboard and pointing device, commonly referred to as a mouse, trackball or touch pad. In addition to such peripheral devices, other input devices may include a microphone, joystick, game pad, satellite dish, scanner, or the like. These and other input devices are often connected to the processing unit 620 through user input 640 and associated interface(s) that are coupled to the system bus 621, but may be connected by other interface and bus structures, such as a parallel port, game port or a universal serial bus (USB). A graphics subsystem may also be connected to the system bus 621. A monitor or other type of display device is also connected to the system bus 621 via an interface, such as output interface 650, which may in turn communicate with video memory. In addition to a monitor, computers may also include other peripheral output devices such as speakers and a printer, which may be connected through output interface 650.

The computer 610 may operate in a networked or distributed environment using logical connections to one or more other remote computers, such as remote computer 670, which may in turn have media capabilities different from device 610. The remote computer 670 may be a personal computer, a server, a router, a network PC, a peer device or other common network node, or any other remote media consumption or transmission device, and may include any or all of the elements described above relative to the computer 610. The logical connections depicted in FIG. 6 include a network 671, examples of which include a local area network (LAN) or a wide area network (WAN), but may also include other networks/buses. Such networking environments are commonplace in homes, offices, enterprise-wide computer networks, intranets and the Internet.

When used in a LAN networking environment, the computer 610 is connected to the network 671 through a network interface or adapter. When used in a WAN networking environment, the computer 610 typically includes a modem or other means for establishing communications over the WAN, such as the Internet. A modem, which may be internal or external, may be connected to the system bus 621 via the user input interface of input 640, or other appropriate mechanism. In a networked environment, program modules depicted relative to the computer 610, or portions thereof, may be stored in a remote memory storage device. It will be appreciated by those skilled in the art that the network connections shown and described are exemplary and other means of establishing a communications link between the computers may be used.

Exemplary Closed System or Console Environment

Figure 7:
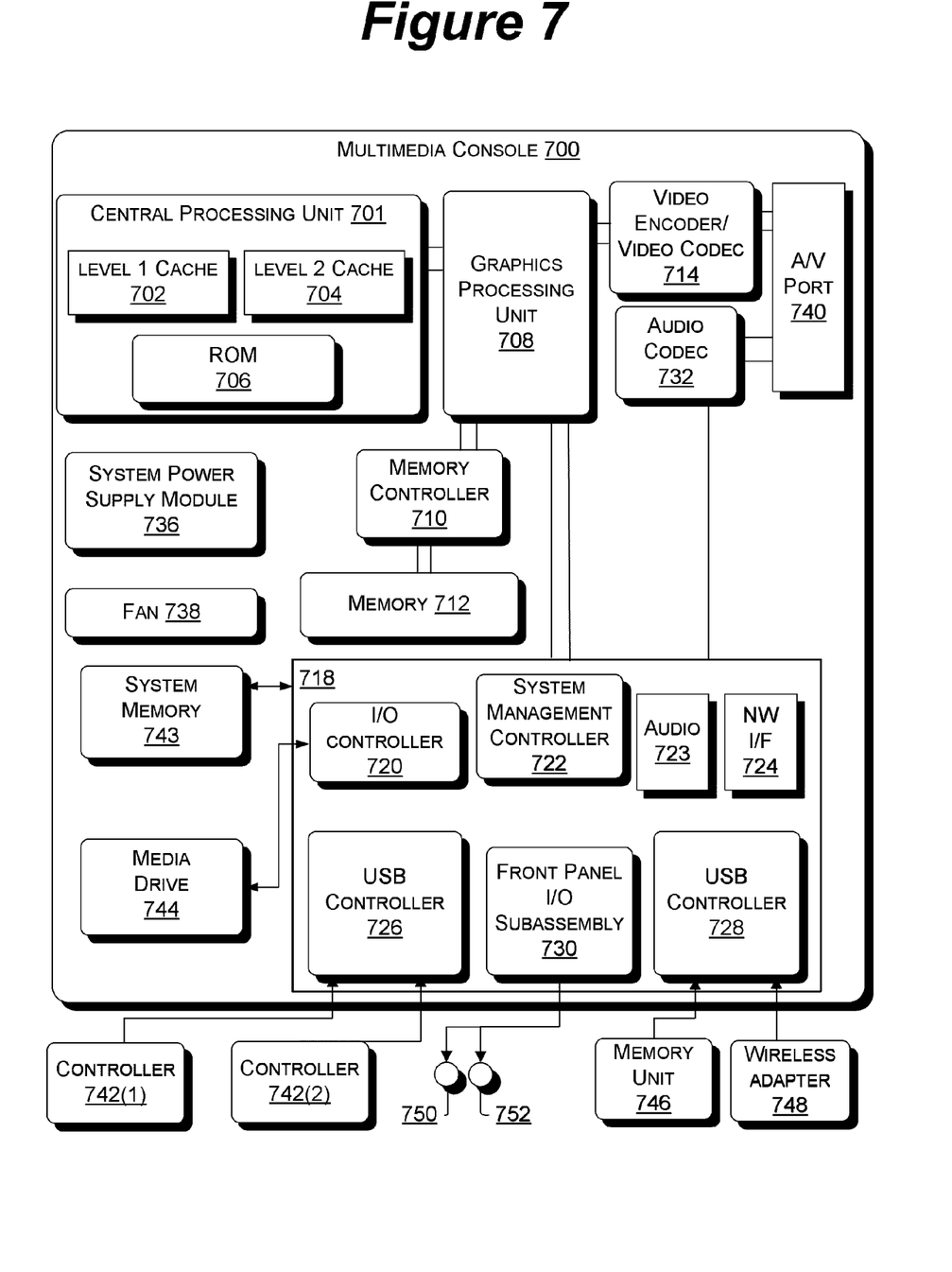
FIG. 7 illustrates a block diagram showing an exemplary non-limiting multimedia console device on which a programming framework may be implemented in accordance with another aspect of the presently disclosed subject matter.

Referring next to FIG. 7, which shows a block diagram illustrating another exemplary non-limiting computing device, an exemplary multimedia console, which may be closed, allowing access only to a limited amount of software components that are signed by some signing authority, such as the closed device manufacturer or a gaming software publisher. FIG. 7 shows the functional components of a multimedia console 700 in which aspects of the presently disclosed subject matter may be implemented. The multimedia console 700 has a central processing unit (CPU) 701 having a level 1 (L1) cache 702, a level 2 (L2) cache 704, and a flash ROM (Read-only Memory) 706. The level 1 cache 702 and level 2 cache 704 temporarily store data and hence reduce the number of memory access cycles, thereby improving processing speed and throughput. The flash ROM 706 may store executable code that is loaded during an initial phase of a boot process when the multimedia console 700 is powered on. Alternatively, the executable code that is loaded during the initial boot phase may be stored in a FLASH memory device (not shown). Further, ROM 706 may be located separate from CPU 701.

This console may have a variety of resources available to it, such as a graphics processing unit (GPU) 708 and a video encoder/video codec (coder/decoder) 714 from a video processing pipeline for high speed and high resolution graphics processing. In this setup, data is carried from the graphics processing unit 708 to the video encoder/video codec 714 via a bus. The video processing pipeline outputs data to an A/V (audio/video) port 740 for transmission to a television or other display. A memory controller 710 is connected to the GPU 708 and CPU 701 to facilitate processor access to various types of memory 712, such as, but not limited to, a RAM (Random Access Memory).

The multimedia console 700 includes an I/O controller 720, a system management controller 722, an audio processing unit 723, a network interface controller 724, a first USB host controller 726, a second USB controller 728 and a front panel I/O subassembly 730 that are preferably implemented on a module 718. The USB controllers 726 and 728 serve as hosts for peripheral controllers 742(1)-742(2), a wireless adapter 748, and an external memory unit 746 (e.g., flash memory, external CD/DVD ROM drive, removable media, etc.). The network interface 724 and/or wireless adapter 748 provide access to a network (e.g., the Internet, home network, etc.) and may be any of a wide variety of various wired or wireless interface components including an Ethernet card, a modem, a Bluetooth module, a cable modem, and the like.

System memory 743 is provided to store application data that is loaded during the boot process. A media drive 744 is provided and may comprise a DVD/CD drive, hard drive, or other removable media drive, etc. The media drive 744 may be internal or external to the multimedia console 700. Application data may be accessed via the media drive 744 for execution, playback, etc. by the multimedia console 700. The media drive 744 is connected to the I/O controller 720 via a bus, such as a Serial ATA bus or other high speed connection (e.g., IEEE 1394).

The system management controller 722 provides a variety of service functions related to assuring availability of the multimedia console 700. The audio processing unit 723 and an audio codec 732 form a corresponding audio processing pipeline with high fidelity and stereo processing. Audio data is carried between the audio processing unit 723 and the audio codec 726 via a communication link. The audio processing pipeline outputs data to the A/V port 740 for reproduction by an external audio player or device having audio capabilities.

The front panel I/O subassembly 730 supports the functionality of the power button 750 and the eject button 752, as well as any LEDs (light emitting diodes) or other indicators exposed on the outer surface of the multimedia console 700. A system power supply module 736 provides power to the components of the multimedia console 700. A fan 738 cools the circuitry within the multimedia console 700.

The CPU 701, GPU 708, memory controller 710, and various other components within the multimedia console 700 are interconnected via one or more buses, including serial and parallel buses, a memory bus, a peripheral bus, and a processor or local bus using any of a variety of bus architectures.

When the multimedia console 700 is powered on or rebooted, application data may be loaded from the system memory 743 into memory 712 and/or caches 702 and 704 and executed on the CPU 701. The application may present a graphical user interface that provides a consistent user experience when navigating to different media types available on the multimedia console 700. In operation, applications and/or other media contained within the media drive 744 may be launched or played from the media drive 744 to provide additional functionalities to the multimedia console 700.

The multimedia console 700 may be operated as a standalone system by simply connecting the system to a television or other display. In this standalone mode, the multimedia console 700 may allow one or more users to interact with the system, watch movies, listen to music, and the like. However, with the integration of broadband connectivity made available through the network interface 724 or the wireless adapter 748, the multimedia console 700 may further be operated as a participant in a larger network community.

The multimedia console depicted in FIG. 7 is a typical multimedia console that may be used to execute a multimedia application, such as a game. Multimedia applications may be enhanced with system features including, for example, system settings, voice chat, networked gaming, the capability of interacting with other users over a network, e-mail, a browser application, etc. Such system features may enable improved functionality for multimedia console 700, such as players in different locations having the capability to play a common game via the Internet.

Also, over time, system features may be updated or added to a multimedia application. Rather than requiring the multimedia developer to make significant modifications to the multimedia application to provide these system features, the systems and methods described herein allow a multimedia developer to provide system features through separate system applications that work in conjunction with the multimedia application. For example, a system application may embody functionality related to networked capabilities, thereby enabling a multimedia application to be readily adapted to provide networked capabilities with little work by the multimedia (e.g., game) developer. One such capability is that of system level notifications for multiple and networked users. Making system level notifications part of a system application as opposed to being handled by individual multimedia applications, such as games running on the system, takes handling displaying notifications such as game invitations out of the development process for multimedia application developers and allows them to focus on the multimedia application itself.

As mentioned above, while exemplary embodiments of the present subject matter have been described in connection with various computing devices and network architectures, the underlying concepts may be applied to any computing device or system in which developer application software may be loaded and executed. For instance, the algorithm(s) and hardware implementations of the discussed aspects may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting.

The various techniques described herein may be implemented in connection with hardware or software or, where appropriate, with a combination of both. Thus, the methods and apparatus of the present subject matter, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed aspects. In the case of program code execution on programmable computers, the computing device generally includes a processor, a storage medium readable by the processor (including volatile and nonvolatile memory and/or storage elements), at least one input device, and at least one output device. One or more programs that may implement or utilize any software provided in accordance with the these aspects are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the presently disclosed aspects may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the presently disclosed subject matter. When implemented on a general-purpose processor, the program code combines with the processor to provide a unique apparatus that operates to invoke the functionality of the present subject matter. Additionally, any storage techniques used in connection with the present aspects may invariably be a combination of hardware and software.

While the aspects described above have been described in connection with the preferred embodiments of the various figures, it is to be understood that other similar embodiments may be used or modifications and additions may be made to the described embodiment for performing the same function without deviating therefrom. For example, one skilled in the art will recognize that the methods, as described in the present application, may apply to any computing device or environment, such as a gaming console, handheld computer, portable computer, etc., whether wired or wireless, and may be applied to any number of such computing devices connected via a communications network, and interacting across the network.

Furthermore, it should be emphasized that a variety of computer platforms, including handheld device operating systems and other application specific operating systems are contemplated, especially as the number of wireless networked devices continues to proliferate. Still further, functionality of the present subject matter may be implemented in or across a plurality of processing chips or devices, and storage may similarly be effected across a plurality of devices. Therefore, the presently discussed aspects should not be limited to any single embodiment, but rather should be construed in breadth and scope in accordance with the appended claims.

The invention claimed is:

1. A method for creating platform abstraction in a computing system by using a programming framework, comprising:
receiving on a programming framework at least one instruction from at least one application program;
maintaining, within the programming framework, a security policy configured to prevent the at least one instruction from controlling or performing a task in the computing system that is not permitted, wherein the security policy identifies one of a command and function that is not permitted;
determining, within the programming framework, whether the at least one instruction violates the security policy;
in response to determining that the at least one instruction violates the security policy, preventing a command corresponding to the at least one instruction from being transmitted to a computing device operating system; and
in response to determining that the at least one instruction does not violate the security policy:
modifying the at least one instruction within the programming framework to fit requirements of the computing device operating system; and
transmitting from the programming framework the modified at least one instruction to the computing device operating system, wherein the programming framework is capable of being configured on at least two computing devices with varied operating systems and hardware, and wherein the programming framework receives the at least one instruction from the at least one application program in an identical manner on the at least two computing devices, regardless of the differing requirements of the computing devices' operating systems and hardware.

2. The method of claim 1, wherein the computing device operating system has at least one resource layer, and wherein the programming framework transmits the at least one instruction to the at least one resource layer of the computing device operating system.

3. The method of claim 2, wherein the computing device operating system has resource layers comprised of at least a graphics layer, an audio layer, an input layer, and a storage layer.

4. The method of claim 2, wherein the programming framework transmits the at least one instruction to the at least one resource layer of the computing device operating system through at least one application programming interface (API).

5. The method of claim 1, wherein the programming framework is integrated into the computing device operating system.

6. The method of claim 1, wherein the programming framework receives at least one instruction from the operating system, modifies the at least one instruction from the operating system as needed to fit the requirements of the application program, and transmits the at least one instruction from the operating system to the application program.

7. The method of claim 1, wherein the at least one instruction received from the at least one application program on the programming framework comprises at least one request for resources controlled by the computing device operating system.

8. A computer readable storage medium having stored thereon computer executable instructions for creating platform abstraction in a computing system by using a programming framework, comprising:
receiving on a programming framework at least one instruction from at least one application program;
maintaining, within the programming framework, a security policy configured to prevent the at least one instruction from controlling or performing a task in the computing system that is permitted, wherein the security policy identifies one of a command and function that is not permitted;
determining, within the programming framework, whether the at least one instruction violates the security policy;
in response to determining that the at least one instruction violates the security policy, preventing a command corresponding to the at least one instruction from being transmitted to a computing device operating system; and
in response to determining that the at least one instruction does not violates the security policy:
modifying the at least one instruction within the programming framework to fit requirements of the computing device operating system; and
transmitting from the programming framework the modified at least one instruction to the computing device operating system, wherein the programming framework is capable of being configured on at least two computing devices with varied operating systems and hardware, and wherein the programming framework receives the at least one instruction from the at least one application program in an identical manner on the at least two computing devices, regardless of the differing requirements of the computing device's operating systems and hardware.

9. The computer readable storage medium of claim 8, wherein the computing device operating system has at least one resource layer, and wherein the programming framework transmits the at least one instruction to the at least one resource layer of the computing device operating system.

10. The computer readable storage medium of claim 9, wherein the computing device operating system has resource layers comprised of at least a graphics layer, and audio layer, an input layer, and a storage layer.

11. The computer readable storage medium of claim 9, wherein the programming framework transmits the at least one instruction to the at least one resource layer of the computing device operating system through at least one application programming interface (API).

12. The computer readable storage medium of claim 8, wherein the programming framework is integrated into the computing device operating system.

13. The computer readable storage medium of claim 8, wherein the programming framework receives at least one instruction from the operating system, modifies the at least one instruction from the operating system as needed to fit the requirements of the application program, and transmits the at least one instruction from the operating system to the application program.

14. A computing system for creating platform abstraction by using a programming framework, comprising:
   a processor; and
   memory having stored thereon computer executable instructions for:
      receiving on a programming framework at least one instruction from at least one application program;
      maintaining, within the programming framework, a security policy configured to prevent the at least one instruction from controlling or performing a task in the computing system that is not permitted, wherein the security policy identifies one of a command and function that is not permitted;
      determining, within the programming framework, whether the at least one instruction violates the security policy;
      in response to determining that the at least one instruction violates the security policy, preventing a command corresponding to the at least one instruction from being transmitted to a computing device operating system; and
      in response to determining that the at least one instruction does not violate the security policy:
         modifying the at least one instruction within the programming framework to fit requirements of the computing device operating system; and
         transmitting from the programming framework the modified at least one instruction to the computing device operating system, wherein the programming framework is capable of being configured on at least two computing devices with varied operating systems and hardware, and wherein the programming framework receives the at least one instruction from the at least one application program in an identical manner on the at least two computing devices, regardless of the differing requirements of the computing devices' operating systems and hardware.

15. The computing system of claim 14, wherein the computing device operating system has at least one resource layer, and wherein the programming framework transmits the at least one instruction to the at least one resource layer of the computing device operating system.

16. The computing system of claim 15, wherein the computing device operating system has resource layers comprised of at least a graphics layer, and audio layer, an input layer, and a storage layer.

17. The computing system of claim 15, wherein the programming framework transmits the at least one instruction to the at least one resource layer of the computing device operating system through at least one application programming interface (API).

18. The computing system of claim 14, wherein the programming framework is integrated into the computing device operating system.

19. The computing system of claim 14, wherein the programming framework receives at least one instruction from the operating system, modifies the at least one instruction from the operating system as needed to fit the requirements of the application program, and transmits the at least one instruction from the operating system to the application program.

* * * * *